United States Patent
Thomas et al.

(10) Patent No.: US 9,845,688 B2
(45) Date of Patent: Dec. 19, 2017

(54) COMPOSITE BLADE WITH AN INTEGRAL BLADE TIP SHROUD AND METHOD OF FORMING THE SAME

(71) Applicants: Rolls-Royce Corporation, Indianapolis, IN (US); Rolls-Royce North American Technologies, Inc., Indianapolis, IN (US)

(72) Inventors: David J. Thomas, Brownsburg, IN (US); Ted J. Freeman, Danville, IN (US); Richard C. Uskert, Timonium, MD (US); Larry A. Junod, Greencastle, IN (US); Joseph Lamusga, Indianapolis, IN (US)

(73) Assignees: Rolls-Royce Corporation, Indianapolis, IN (US); Rolls-Royce North American Technologies Inc., Indianapolis, IN (US)

( * ) Notice: Subject to any disclaimer, the term of this patent is extended or adjusted under 35 U.S.C. 154(b) by 1037 days.

(21) Appl. No.: 14/138,627

(22) Filed: Dec. 23, 2013

(65) Prior Publication Data
US 2015/0044050 A1 Feb. 12, 2015

Related U.S. Application Data

(60) Provisional application No. 61/799,666, filed on Mar. 15, 2013.

(51) Int. Cl.
| | | |
|---|---|---|
| F01D 5/14 | (2006.01) | |
| F01D 5/22 | (2006.01) | |
| F01D 5/28 | (2006.01) | |

(52) U.S. Cl.
CPC ............. *F01D 5/225* (2013.01); *F01D 5/147* (2013.01); *F01D 5/282* (2013.01); *F01D 5/284* (2013.01);
(Continued)

(58) Field of Classification Search
CPC .......... F01D 5/147; F01D 5/282; F01D 5/225; F01D 5/284; Y02T 50/672; F05D 2300/6033
See application file for complete search history.

(56) References Cited

U.S. PATENT DOCUMENTS

| | | |
|---|---|---|
| 3,632,460 A | 1/1972 | Palfreyman et al. |
| 6,196,794 B1 | 3/2001 | Matsumoto |

(Continued)

FOREIGN PATENT DOCUMENTS

| | | |
|---|---|---|
| DE | 10323132 A1 | 12/2004 |
| EP | 2562360 A2 | 2/2013 |

OTHER PUBLICATIONS

International Search Report for PCT International Application Serial No. PCT/US2013/077455, dated Apr. 14, 2014.

*Primary Examiner* — Craig Kim
*Assistant Examiner* — Maxime Adjagbe
(74) *Attorney, Agent, or Firm* — Barnes & Thornburg LLP

(57) ABSTRACT

A gas turbine engine airflow member including a blade core portion, a shroud tip portion extending from the blade core portion, and an airfoil portion formed exteriorly to the blade core portion, where the blade core portion and the shroud tip portion are constructed as a first unitary structure and the airfoil portion is constructed as a second structure. A method of forming a gas turbine engine component is also disclosed.

13 Claims, 2 Drawing Sheets

(52) U.S. Cl.
CPC ..... *F05D 2300/6033* (2013.01); *Y02T 50/672* (2013.01); *Y10T 29/49321* (2015.01)

(56) References Cited

U.S. PATENT DOCUMENTS

| | | |
|---|---|---|
| 6,607,358 B2 | 8/2003 | Finn et al. |
| 6,676,373 B2 | 1/2004 | Marlin et al. |
| 6,676,378 B2 * | 1/2004 | Corbin .................... F01D 5/147 29/889 |
| 7,066,717 B2 | 6/2006 | Morrison et al. |
| 7,093,359 B2 | 8/2006 | Morrison et al. |
| 7,241,112 B2 | 7/2007 | Dambrine et al. |
| 7,410,342 B2 | 8/2008 | Matheny |
| 7,722,320 B2 * | 5/2010 | Matsumoto ............. F01D 5/147 29/889.2 |
| 2005/0158171 A1 * | 7/2005 | Carper .................... B32B 18/00 415/200 |
| 2008/0038113 A1 | 2/2008 | Matsumoto et al. |
| 2009/0232647 A1 * | 9/2009 | Henkle ............... B29C 45/0005 415/200 |
| 2010/0021290 A1 | 1/2010 | Schaff et al. |
| 2010/0322776 A1 | 12/2010 | Laurent |
| 2011/0299976 A1 * | 12/2011 | Uskert .................... F01D 5/225 415/173.1 |

\* cited by examiner

COMPOSITE BLADE WITH AN INTEGRAL BLADE TIP SHROUD AND METHOD OF FORMING THE SAME

CROSS REFERENCE TO RELATED APPLICATIONS

This application claims priority to and the benefit of U.S. Provisional Patent Application No. 61/799,666, filed 15 Mar. 2013, the disclosure of which is now expressly incorporated herein by reference.

TECHNICAL FIELD

The present application generally relates to gas turbine engine components, and more particularly but not exclusively relates to composite blade structures for use in gas turbine engines.

BACKGROUND

In gas turbine engines, blade tip shrouds are sometimes incorporated into metal blade structures to improve efficiency. Additionally, in some applications, providing blade structures having a composite construction is of interest in view of potential weight reduction and cooling features. However, fabricating a composite blade structure having an integral blade tip shroud presents challenges in both design and the manufacturing process. Accordingly, there remains a need for further contributions in this area of technology.

SUMMARY

The present disclosure may comprise one or more of the following features and combinations thereof and/or features and combinations of the claims.

One embodiment of the present invention is a unique gas turbine engine. Another embodiment is a unique machine. A further embodiment is a unique gas turbine engine turbomachinery component. A further embodiment is a method of forming a gas turbine engine component. Other embodiments include apparatuses, systems, devices, hardware, methods, and combinations for machines and self-aligning foil bearing systems. Further embodiments, forms, features, aspects, benefits, and advantages of the present application will become apparent from the description and figures provided herewith or one or more of the claims or combinations thereof.

These and other features of the present disclosure will become more apparent from the following description of the illustrative embodiments.

DETAILED DESCRIPTION OF THE ILLUSTRATED EMBODIMENTS

Figure 1:
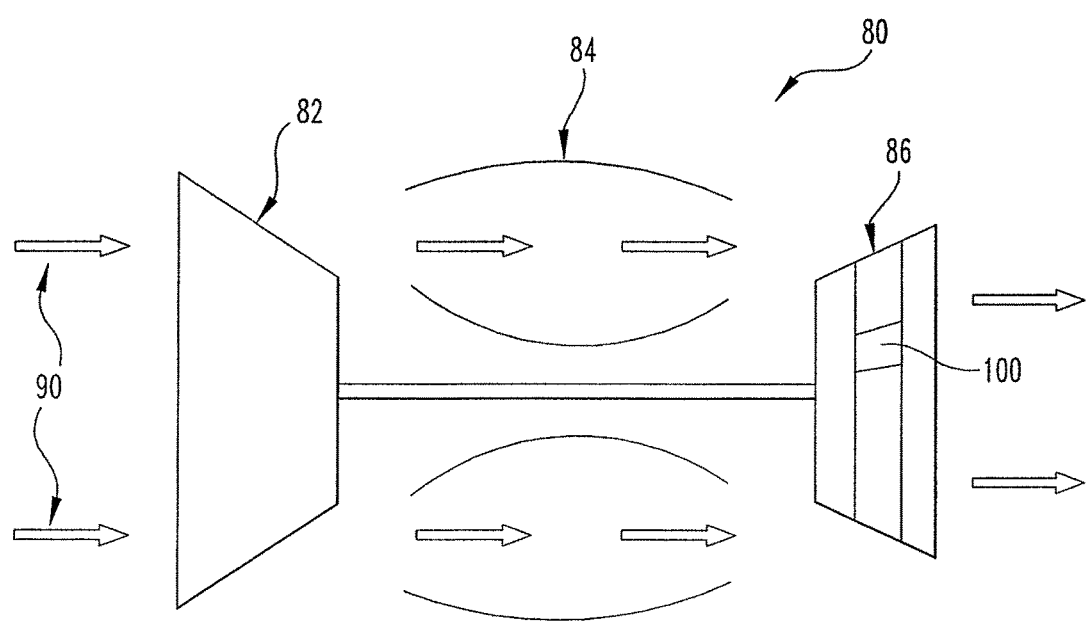
FIG. 1 depicts one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is hereby intended. Any alterations and further modifications in the described embodiments, and any further applications of the principles of the invention as described herein are contemplated as would normally occur to one skilled in the art to which the invention relates.

With reference to FIG. 1, shown therein is a gas turbine engine 80 which generally includes a compressor section 82, a combustor section 84, and a turbine section 86. An air flow stream 90 is provided to the compressor section 82 wherein the air flow stream is compressed and provided to the combustor section 84. Fuel is thereafter mixed with the compressed air and the mixture is burned and provided at a higher temperature and pressure to the turbine section 86. In one form, the turbine section 86 includes a plurality of gas turbine engine components 100. The gas turbine engine components 100 can take the form of an airflow member such as, for example, a rotatable blade, or can take other forms for use in various portions of the gas turbine engine 80. Though the gas turbine engine 80 is depicted as a single spool engine, in other embodiments, the gas turbine engine 80 can be provided with multiple spools. Additionally, the gas turbine engine 80 can be used in various applications and can take a variety of forms. To set forth a few non-limiting examples, the gas turbine engine 80 can take the form of a turbofan, turbojet, turboprop, or turboshaft engine.

As used herein, the term "aircraft" includes but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Additionally, use of the present application in other applications outside of the aircraft field are also contemplated including, for example, industrial applications, power generation, pumping sets, naval propulsion, weapon systems, security systems, perimeter defense/security systems, and other applications known to those of ordinary skill in the art.

Figure 2:
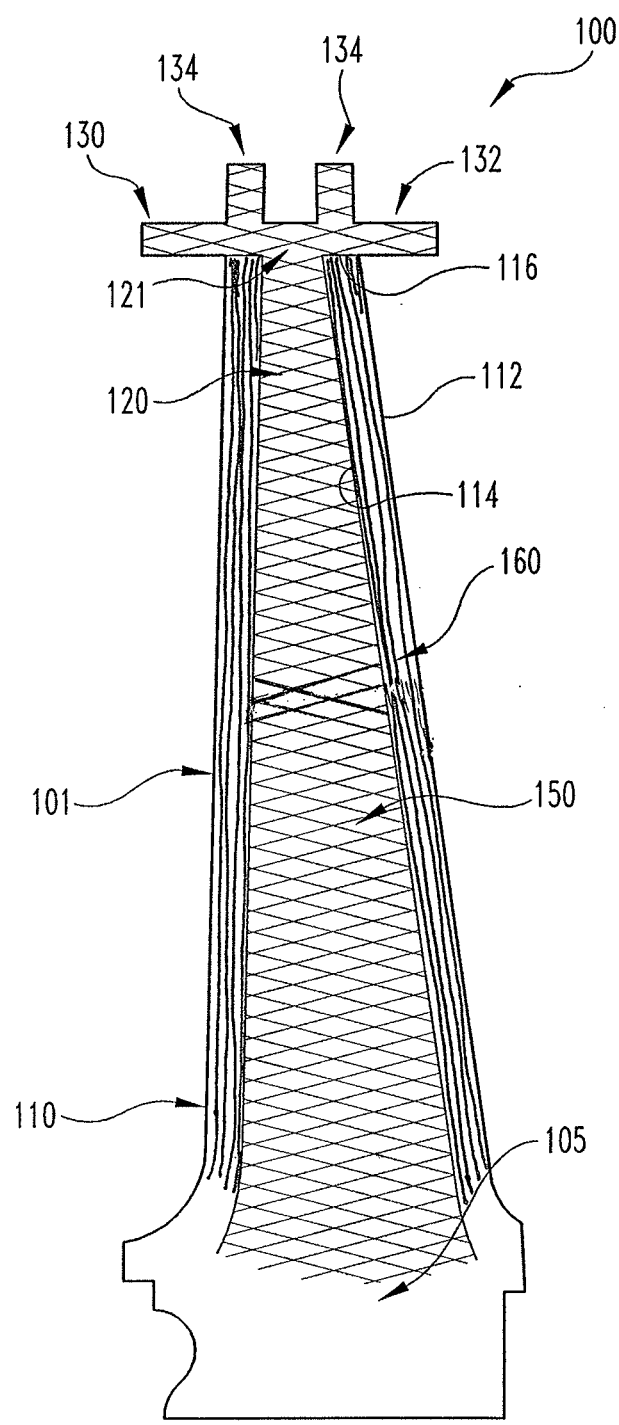
FIG. 2 is a partial cross-sectional view of one embodiment of a gas turbine engine airflow member.

With reference to FIG. 2, shown therein is a partial cross-sectional view of a gas turbine engine component 100 according to one form of the present application. The gas turbine engine component 100 is shown as having the shape of an airflow member or blade for use in association with a turbomachinery component within a gas turbine engine. However, the gas turbine engine component 100 can take on other forms and configurations for use in other portions of a gas turbine engine. The gas turbine engine component 100 generally includes an external airfoil portion 110, a blade core portion 120, and a shroud tip portion 130. The blade core portion 120 provides a base for forming the airfoil portion 110. The shroud tip portion 130 extends from the core portion 120 via an integration region 121 that is structured to withstand high stresses between the blade core portion 120 and the shroud tip portion 130, as well as to withstand high inter-laminar stresses in the tip region of the shroud tip portion 130.

In the illustrated embodiment, the airfoil portion 110 defines an elongated portion 101 of the gas turbine engine component 100 formed external to the blade core portion 120 and oriented along a length or radial dimension of the gas turbine engine component 100. The airfoil portion 110 includes an external blade surface 112 that can be provided with airflow properties including high temperature resistance. In one embodiment, the external blade surface 112 provides a guide for air flowing over the gas turbine engine component 100. The properties and dimensions of the external blade surface 112 can be provided to optimize rotational forces and minimize inefficiencies of the gas turbine engine component 100. In other embodiments, the external blade surface 112 can be constructed in order to withstand the high temperatures and erosion characteristics associated with the air flow. The airfoil portion 110 also includes an interior interface surface 114 where the airfoil portion 110 interfaces with the blade core portion 120. In one embodiment, the interface surface 114 defines substantially the entire area or region between the airfoil portion 110 and the blade core portion 120. In one embodiment, the interface surface 114 can be distinct or separated by one or more layers. In other embodiments, the interface surface 114 can include a chemical or mechanical bond with one or more layers, or substantially no bond or a partial bond where the airfoil portion 110 is physically held in position relative to the blade core portion 120 via an interference fit, by the shroud tip portion 130, or by other structures or techniques.

In the illustrated embodiment, the airfoil portion 110 is shown as terminating at the shroud tip portion 130, thereby forming a shroud interface 116. In this embodiment, the shroud interface 116 can be a substantially even edge extending along the full thickness of the airfoil portion 110. In other embodiments, the shroud interface 116 can include a tapered or uneven edge (not shown). In another embodiment, a tapered edge can slope away from the shroud tip portion 130, thereby allowing expanded geometry or dimensions for the shroud tip portion 130. In a further embodiment, a tapered edge of the shroud interface 116 can slope toward the shroud tip portion 130, thereby creating an edge which can, for example, accommodate a radius defined by the integration region 121 or a fiber reinforced filler. The shroud interface 116 can include an adhesion layer (not shown) or can define a free edge. The shroud interface 116 can also terminate short of the shroud tip portion 130 and thereby not contact the shroud tip portion 130. In the illustrated embodiment, the end region of the gas turbine engine component 100 opposite the shroud tip portion 130 includes a dovetail end portion 105. In one embodiment, the airfoil portion 110 partially encompasses the dovetail portion 105 and can thereby leave an area of the dovetail portion 105 exposed. In another embodiment, the airfoil portion 110 can substantially entirely encompass the dovetail portion 105. In a further embodiment, the airfoil portion 110 can be constructed with the dovetail portion 105 provided as an integral part of the airfoil portion 110.

In one embodiment of the gas turbine engine component 100, the airfoil portion 110 is constructed as a fiber reinforced composite having a thickness between the external blade surface 112 and the interface surface 114. The thickness of the airfoil portion 110 can remain constant in relation to the elongated portion 101 of the gas turbine engine component 100, or the thickness of the airfoil portion 110 can vary along the elongated portion 101. In further embodiments, the airfoil portion 110 can be provided as a continuous wrap ply, or can be provided as multiple individual plies to form a two-dimensional fiber reinforced composite. The airfoil portion 110 can also be provided as multiple sections of plies oriented in the same or different directions. The plies that form the airfoil portion 110 can be applied with or without extending from the dovetail portion 105 of the gas turbine engine component 100 to its tip or proximate the shroud tip portion 130.

In various embodiments, the airfoil portion 110 of the gas turbine engine component 100 can be constructed as a fiber reinforced composite that includes a matrix and one or more plies that include a plurality of fibers. Additionally, the fibers can be unidirectional or cross-plied, as well as other orientations. In general, the plies can be provided with any architecture including, for example, 2D, tape, woven, etc. In some forms, such as some two-dimensional architectures, adjacent plies can be stitched together to maintain a shape during the manufacturing process. During fiber ply construction, anisotropy of material properties can be controlled by placing fibers on preferential planes. Fibers or textile reinforcements can be produced using various techniques such as weaving, braiding, knitting and non-woven. In two-dimensional oriented or planar interlocked structures, the fiber layers can include chopped strand mats, pre-impregnated sheets and plain, tri-axial, or multi-axial weaves. In one embodiment, the airfoil portion 110 is made from a ceramic matrix composite (CMC) material. However, other types of composite materials are also contemplated. The matrix included in the CMC composite can be applied in a variety of ways, including via a single application step or via multiple application steps. Additionally, the matrix can be deposited via chemical vapor deposition or via other suitable techniques. In still other embodiments, filler can be used in select areas of the gas turbine engine component 100, and in some cases can be provided between fiber plies wherein the orientation of the plies creates voids. Such fillers can be placed, for example, between the plies of the airfoil portion 110 near the shroud tip portion 130 of the gas turbine engine component 100, or in other regions of the gas turbine engine component 100.

In one embodiment, a fiber reinforced construction of the airfoil portion 110 can be provided as a single-piece, unitary construction. In another embodiment, the fiber reinforced composite structure of the airfoil portion 110 can be varied along the elongated portion 101 or along other regions of the airfoil portion 110. The structure of the airfoil portion 110 can be determined based on blade surface properties, blade thickness or profile, localized stresses, temperature profiles, fiber reinforced composite structure profile, and the like.

As shown in FIG. 2, in one embodiment, the blade core portion 120 is the core on which the airfoil portion 110 is formed. The blade core portion 120 can include an integrated shroud tip portion 130. In one embodiment, the blade core portion 120 and the shroud tip portion 130 are formed as a single-piece, unitary structure. In a further embodiment, the blade core portion 120 and the shroud tip portion 130 can include a hybrid architecture with a three-dimensional fiber arrangement to provide improved inter-laminar properties. In one embodiment, the blade core portion 120 can extend along the gas turbine engine component 100 approximately from the dovetail portion 105 to the integration region 121. The blade core portion 120 can be constructed with the dovetail portion 105 or a partial dovetail portion wherein the dovetail portion forms an integral part of the blade core portion 120. The integration region 121 includes the area between the blade core portion 120 and the shroud tip portion 130. Additionally, the integration region 121 can have a sharp or smooth profile, and can be provided with curved or straight sections.

In various embodiments, the blade core portion 120 can be fabricated by various methods and can be formed, for example, from a monolithic material or a fiber reinforced composite having a two-dimensional or three-dimensional configurations and orientations. In one specific embodiment, the blade core portion 120 can be constructed as a single-piece monolithic structure with the shroud tip portion 130 integral to the blade core portion 120. The single-piece monolithic structure can create a bond area between the blade core portion 120 and the airfoil portion 110 at the interface surface 114.

In another embodiment, the blade core portion 120 can include a fiber reinforced composite material which can be constructed with a continuous wrap ply, or can be created by individual plies to form a two- or three-dimensional fiber reinforced composite. The blade core portion 120 can have multiple sections of plies oriented in the same or different directions. The plies that form the blade core portion 120 can be applied with or without an individual ply extending from the dovetail region 105 of the gas turbine engine component 100 to its tip or proximate the shroud tip portion 130. In other embodiments, the blade core portion 120 of the gas turbine engine component 100 can be constructed with a fiber reinforced composite that includes a matrix and one or more plies that include a plurality of fibers. In addition, the fibers can be unidirectional or cross-plied, as well as other suitable configurations or orientations. In general, the plies can be various architectures, including, for example, 2D, 3D, tape, woven, etc. Additionally, material properties can be controlled as discussed above.

The selection of two-dimensional versus three-dimensional structures can be based on architectural possibilities, material characteristics and behavior (dimensional stability, mechanical strength, drape and formability, etc.), and/or manufacturing constraints. Complex architecture often produces a shape which is similar to the shape of the final product allowing for fewer post-forming processing steps. The complex architecture of a three-dimensional composite material is made possible via fabrics having high density, extensibility, formability, especially drape characteristics, and low fiber damage. A complex shape applied to the blade core portion 120 and the shroud tip portion 130 in accordance with various embodiments can be integrally constructed with a three-dimensional architecture to produce a near net shape on which to lay the airfoil portion 110.

In one embodiment, the blade core portion 120 is made from a ceramic matrix composite (CMC) material. However, other types of composite materials are also contemplated. The matrix used in the CMC composite can be applied in a variety of ways, including via a single application step or multiple application steps. Additionally, the matrix can be deposited via chemical vapor deposition among other possible techniques. As set forth above, fillers can also be used.

In one embodiment, the shroud tip portion 130 is anchored to the gas turbine engine component 100 by the blade core portion 120 via the integration region 121. As should be appreciated, inclusion of a shroud at the tip of a blade can improve the efficiency of the gas turbine engine. An integral shroud tip can also increase strength properties for maintaining the shroud tip design. The integral nature of the shroud tip portion 130 with the blade core portion 120 also provides improved bond strength relative to other techniques such as localized bonding at the tip or some type of mechanical attachment at the tip. In one embodiment, a single construction for the blade core portion 120 and the shroud tip portion 130 through the integration region 121 can be used to provide further strength in the integration region 121.

In one embodiment, the shroud tip portion 130 has a generally rectangular cross section, although other shapes and configurations are also contemplated as would occur to those having ordinary skill in the art. The thickness can be uniform or can vary along the shroud tip portion 130. Additionally, the proportions and placement of the shroud tip portion 130 can also vary between embodiments, as well as within a single embodiment.

In the embodiment of the gas turbine engine component 100 illustrated in FIG. 2, the shroud tip portion 130 is shown as having a lateral portion 132 extending from the integration region 121, and a set of sealing knife portions 134 extending radially outward from the lateral portion 132. The sealing knife portions 134 can be used in association with a device or structure formed in or coupled to a casing of the gas turbine engine. Although the illustrated embodiment of the shroud tip portion 130 includes two sealing knife portions 134, it should be understood that the shroud tip portion 130 can include a single sealing knife portion or three or more sealing knife portions. Additionally, other embodiments are also contemplated where the shroud tip portion 130 is provided without the sealing knife portions 134, or is provided with sealing knife portions 134 having other shapes and configurations.

In one embodiment, the gas turbine engine component 100 includes the blade core portion 120 and the shroud tip portion 130 constructed of a first composite material construction or architecture 150, and the airfoil portion 110 is constructed of a second composite material construction or architecture 160. The second composite material construction 160 of the airfoil portion 110 is formed on or external to the first composite material construction 150 commensurate to the blade core portion 120. In a further embodiment, the first composite material construction 150 of the blade core portion 120 and the shroud tip portion 130, and the second composite material construction 160 of the airfoil portion 110 are infiltrated with a common matrix material. In still other embodiments, the first composite material construction 150 of the blade core portion 120 and the shroud tip portion 130, and the second composite material construction 160 of the airfoil portion 110 are subject to a singular infiltration process with a common matrix material to form an integral composite construction of the gas turbine engine component 100.

In one form of manufacture, multiple plies of composite construction for the blade core portion 120, the shroud tip portion 130, and the airfoil portion 110 can be collated together to a desired thickness and can be formed to any desired shape. The plies can be collated on tooling, such as a mold or a mandrel, among others, to define the shape, or near shape, of the desired component. During fabrication, the composite construction can be rigidized while coupled with the tooling and prior to introduction of the matrix. Rigidization can occur separately or together for the blade core portion 120, the shroud tip portion 130, and the airfoil portion 110. In this embodiment, a matrix is provided to infiltrate between the plies and fibers to form the composite construction of the gas turbine engine component 100.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A gas turbine engine airflow member, comprising:
a blade core portion;
a shroud tip portion extending from the blade core portion;
an airfoil portion formed exteriorly to and surrounding the blade core portion and terminating at the shroud tip portion forming a shroud interface at a lateral portion of the shroud tip portion; and
wherein the blade core portion and the shroud tip portion are constructed as a first unitary structure and the airfoil portion is constructed as a second structure,
wherein the first unitary structure is formed of a single-piece monolithic material and the second structure is formed of a composite material having a plurality of fiber plies with a two dimensional orientation,
wherein the single-piece monolithic material comprises a first composite material and wherein the second structure comprises a second composite material, and
wherein the first composite material includes a first plurality of fiber plies having a three dimensional orientation, and wherein the second composite material includes a second plurality of fiber plies having a two dimensional orientation,
further including a sealing knife portion extending from the shroud tip portion opposite the shroud interface.

2. The gas turbine engine airflow member of claim 1, wherein the blade core portion and the shroud tip portion form the single-piece monolithic structure.

3. The gas turbine engine airflow member of claim 1, wherein the first composite material and the second composite material are subjected to a singular infiltration process with a common matrix material.

4. The gas turbine engine airflow member of claim 3, wherein the common matrix material includes a ceramic material.

5. A gas turbine engine turbomachinery component, comprising:
a plurality of airflow members structured to direct a flow stream through the turbomachinery component, each of the plurality of airflow members including:
a blade core portion and a shroud tip portion integral with one another to define a first single-piece unitary structure; and
an airfoil portion defining a second structure formed external to and surrounding the blade core portion and terminating at a lateral portion of the shroud tip portion, and
wherein the first single-piece unitary structure comprises a first composite material construction comprising a first plurality of fiber plies.

6. The gas turbine engine turbomachinery component of claim 5, wherein the first composite material construction comprises a ceramic matrix composite.

7. The gas turbine engine turbomachinery component of claim 5, wherein the first composite material construction comprises a first plurality of fiber plies with a two dimensional architecture.

8. The gas turbine engine turbomachinery component of claim 5, wherein the first composite material construction comprises a first plurality of fiber plies with a three dimensional architecture.

9. The gas turbine engine turbomachinery component of claim 8, wherein the second structure comprises a second composite material construction including a second plurality of fiber plies.

10. The gas turbine engine turbomachinery component of claim 9, wherein the second plurality of fiber plies includes a two dimensional architecture.

11. A method, comprising:
forming a single-piece unitary construction of a gas turbine engine component including
a blade core portion and an integral shroud tip portion; and
laying up at least one ply of a second construction to form an airfoil portion external to and surrounding the blade core portion and terminating at a lateral portion of the shroud tip portion, and
wherein said forming further includes constructing a first fiber reinforced composite having a first plurality of fiber plies with a three dimensional architecture.

12. The method of claim 11, wherein said laying up further includes constructing a second fiber reinforced composite having a second plurality of fiber plies with a two dimensional architecture.

13. The method of claim 11, further including infiltrating the single-piece unitary construction and the second construction with a common matrix material.

* * * * *